United States Patent
Takehara et al.

(10) Patent No.: US 10,984,357 B2
(45) Date of Patent: *Apr. 20, 2021

(54) APPARATUS AND METHOD FOR ESTIMATING PRODUCTION CAPACITY

(71) Applicant: Panasonic Intellectual Property Management Co., Ltd., Osaka (JP)

(72) Inventors: Hirokazu Takehara, Yamanashi (JP); Takuya Yamazaki, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 390 days.

This patent is subject to a terminal disclaimer.

(21) Appl. No.: 15/489,956

(22) Filed: Apr. 18, 2017

(65) Prior Publication Data

US 2017/0308832 A1 Oct. 26, 2017

(30) Foreign Application Priority Data

Apr. 26, 2016 (JP) .............................. JP2016-087717

(51) Int. Cl.
 *G06Q 10/06* (2012.01)
(52) U.S. Cl.
 CPC .............................. *G06Q 10/06313* (2013.01)
(58) Field of Classification Search
 None
 See application file for complete search history.

(56) References Cited

U.S. PATENT DOCUMENTS 5,999,920 A * 12/1999 Sato .................. G06Q 10/04
 705/400
7,366,579 B2 * 4/2008 Ara .................... G06Q 10/00
 700/111

(Continued)

FOREIGN PATENT DOCUMENTS

CN  1836477 A  9/2006
JP  H10-084197 A  3/1998

(Continued)

OTHER PUBLICATIONS

Neammanee, Patcharaporn, and Manop Reodecha. "A memetic algorithm-based heuristic for a scheduling problem in printed circuit board assembly." Computers & Industrial Engineering 56.1 (2009): 294-305. (Year: 2009).*

(Continued)

*Primary Examiner* — Matthew S Gart
*Assistant Examiner* — Derick J Holzmacher
(74) *Attorney, Agent, or Firm* — Pearne & Gordon LLP

(57) ABSTRACT

A method is provided for estimating production capacity of a component mounting line for producing assembly boards. The component mounting line includes component-mounting-relevant devices coupled to one another, including a component mounter. Operator information is provided, which relates to an operator. Production-plan information is provided, which relates to a production plan for producing the assembly boards scheduled in the component mounting line. Based on floor-disposition information, production-lot information, event information, the operator information, and the production-plan information, a production capacity of the component mounting line is estimated. The floor-disposition information relates to a disposition of the component mounting line on a floor. The production-lot information relates to a time necessary for the component-mounting-relevant devices to produce the assembly boards.

(Continued)

The event information relates to an event indicating that a work of the operator is necessary for the component-mounting-relevant devices and occurrence frequency indicating the number of occurrences of the event.

8 Claims, 17 Drawing Sheets

(56) References Cited

U.S. PATENT DOCUMENTS

| | | | | |
|---|---|---|---|---|
| 7,957,822 | B2* | 6/2011 | Morita | H05K 13/0888 700/56 |
| 9,613,329 | B2* | 4/2017 | Kamioka | G05B 23/02 |
| 10,521,743 | B2* | 12/2019 | Yamashita | G06Q 10/06311 |
| 10,591,907 | B2* | 3/2020 | Kobayashi | H05K 13/00 |
| 10,620,614 | B2* | 4/2020 | Nakazono | G05B 19/41865 |
| 2006/0200264 | A1* | 9/2006 | Kodama | H05K 13/08 700/121 |
| 2017/0061365 | A1* | 3/2017 | Nonoyama | H05K 13/02 |

FOREIGN PATENT DOCUMENTS

| | | | | |
|---|---|---|---|---|
| JP | 2002-297216 A | | 10/2002 | |
| JP | 2003-224400 A | | 8/2003 | |
| WO | WO-02056662 A1 | * | 7/2002 | ......... H05K 13/0882 |
| WO | 2005/009101 A1 | | 1/2005 | |
| WO | WO-2005009101 A1 | * | 1/2005 | ............. H05K 13/08 |
| WO | WO-2010060181 A1 | * | 6/2010 | ........... G06Q 10/063 |

OTHER PUBLICATIONS

Bard, Jonathan F., Raymond W. Clayton, and Thomas A. Feo. "Machine setup and component placement in printed circuit board assembly." International Journal of Flexible Manufacturing Systems 6.1 (1994): 5-31. (Year: 1994).*

Crama, Yves, Joris van de Klundert, and Frits CR Spieksma. "Production planning problems in printed circuit board assembly." Discrete Applied Mathematics 123. 1-3 (2002): 339-361. (Year: 2002).*

Kim, Yeong-Dae, Hyeong-Gyu Lim, and Moon-Won Park. "Search heuristics for a flowshop scheduling problem in a printed circuit board assembly process." European Journal of Operational Research 91.1 (1996): 124-143. (Year: 1996).*

English Translation of Chinese Search Report dated Mar. 11, 2020 for the related Chinese Patent Application No. 201710255071.X.

* cited by examiner

FIG. 4

LINE ID : L1 ←— 47

| LOT ID | ASSEMBLY BOARD | DEVICE ID | COMPONENT DISPOSITION | | TAKT TIME |
| --- | --- | --- | --- | --- | --- |
| | | | POSITION | COMPONENT NUMBER | |
| AA1 | AA | M2 | — | — | 10 SECONDS |
| | | M3 | — | — | 20 SECONDS |
| | | M4 | — | — | 100 SECONDS |
| | | M5 | — | — | 10 SECONDS |
| | | M6R | S1 | aa1 | 150 SECONDS |
| | | | S5 | aa3 | |
| | | | ⋮ | ⋮ | |
| | | | S30 | bb21 | |
| | | M7R | S3 | bb31 | 200 SECONDS |
| | | | ⋮ | ⋮ | |
| | | | S25 | cc2 | |
| | | M8R | S10 | aa7 | 160 SECONDS |
| | | | ⋮ | ⋮ | |
| | | | S28 | dd10 | |
| | | M9R | T1 | ee1 | 100 SECONDS |
| | | | T2 | ee2 | |
| | | M10 | — | — | 10 SECONDS |
| | | M11 | — | — | 180 SECONDS |
| AA2 | AA | M3 | — | — | 20 SECONDS |
| | | ⋮ | ⋮ | ⋮ | ⋮ |
| BB1 | BB | M3 | — | — | 30 SECONDS |
| | | ⋮ | ⋮ | ⋮ | ⋮ |
| ⋮ | ⋮ | ⋮ | ⋮ | ⋮ | ⋮ |
| ↑41 | ↑42 | ↑43 | ↑44 | ↑45 | ↑46 |

FIG. 5

| EVENT CONTENT | | | OCCURRENCE FREQUENCY | AUTOMATIC RECOVERY | WORK TIME/ RECOVERY TIME |
|---|---|---|---|---|---|
| MAJOR ITEM | MEDIUM ITEM | MINOR ITEM | | | |
| REPLENISHMENT WORK | SOLDER REPLENISHMENT | — | — | — | 210 SECONDS |
| REPLENISHMENT WORK | TAPE REPLENISHMENT | COMPONENT: aa1 | — | — | 120 SECONDS |
| REPLENISHMENT WORK | TAPE REPLENISHMENT | COMPONENT: aa3 | — | — | 120 SECONDS |
| REPLENISHMENT WORK | TRAY REPLACEMENT | COMPONENT: ee1 | — | — | 90 SECONDS |
| ⋮ | ⋮ | ⋮ | ⋮ | ⋮ | ⋮ |
| DEVICE ERROR | PRINTING ERROR | — | 800ppm | × | 210 SECONDS |
| DEVICE ERROR | SUCTION ERROR | COMPONENT: aa1 | 500ppm | ○ | 10 SECONDS |
| DEVICE ERROR | SUCTION ERROR | COMPONENT: aa3 | 100ppm | ○ | 10 SECONDS |
| DEVICE ERROR | SUCTION ERROR | COMPONENT: ee1 | 300ppm | × | 60 SECONDS |
| DEVICE ERROR | JAMMING | COMPONENT: aa1 | 20ppm | × | 110 SECONDS |
| DEVICE ERROR | JAMMING | COMPONENT: aa3 | 10ppm | × | 90 SECONDS |
| ⋮ | ⋮ | ⋮ | ⋮ | ⋮ | ⋮ |

| OPERATOR ID | REPLENISHMENT WORK AND REPLACEMENT WORK | | | | DEVICE ERROR RECOVERY WORK | | | | SET-UP CHANGING WORK | MOVEMENT SPEED | WORK SCHEDULE | |
| --- | --- | --- | --- | --- | --- | --- | --- | --- | --- | --- | --- | --- |
| | SOLDER | TAPE | TRAY | | PRINTING | SUCTION | TAPE | TRAY | | | BELONGING GROUP | LEAVES-OF-ABSENCE SCHEDULE |
| OP1 | A | A | A | | ○ | ○ | ○ | ○ | ○ | B | A GROUP | 4/5 |
| OP2 | B | A | A | | ○ | ○ | ○ | ○ | ○ | A | B GROUP | 4/11 |
| OP3 | C | B | B | | × | × | ○ | ○ | ○ | B | C GROUP | 4/3 |
| OP4 | B | B | B | | ○ | ○ | ○ | ○ | ○ | C | D GROUP | 4/7 |
| OP5 | × | C | C | | × | × | × | × | × | A | A GROUP | 4/12 |
| ... | ... | ... | ... | | ... | ... | ... | ... | ... | ... | ... | ... |

| LOT ID | ASSEMBLY BOARD | LANE ID | PRODUCTION START DATE AND TIME | PRODUCTION NUMBER | SET-UP TIME |
|---|---|---|---|---|---|
| AA1 | AA | L1R | 4/1 06:30 | 500 | 15 MINUTES |
| AA2 | AA | L1F | 4/1 06:30 | 500 | 15 MINUTES |
| AA3 | AA | L1R | 4/2 06:30 | 500 | — |
| AA4 | AA | L1F | 4/2 06:30 | 500 | — |
| AA5 | AA | L1R | 4/3 06:30 | 300 | — |
| BB1 | BB | L2R | 4/1 12:00 | 400 | 20 MINUTES |
| BB2 | BB | L2F | 4/1 14:30 | 400 | 20 MINUTES |
| CC1 | CC | L3R | 4/1 10:10 | 500 | 15 MINUTES |
| CC2 | CC | L3F | 4/1 11:40 | 500 | 15 MINUTES |
| CC3 | CC | L3R | 4/2 08:00 | 100 | — |
| DD1 | DD | L2R | 4/2 10:00 | 400 | 20 MINUTES |
| DD2 | DD | L2F | 4/2 12:30 | 400 | 20 MINUTES |
| DD3 | DD | L2R | 4/3 08:00 | 400 | — |
| ⋮ | ⋮ | ⋮ | ⋮ | ⋮ | ⋮ |
| ↑ 71 | ↑ 72 | ↑ 73 | ↑ 74 | ↑ 75 | ↑ 76 |

FIG. 8

| EVENT OCCURRENCE DATE AND TIME | EVENT CONTENT | LINE ID | DEVICE ID | COMPONENT DISPOSITION | | OPERATOR ID | DEVICE STOPPAGE TIME | WORK TIME |
|---|---|---|---|---|---|---|---|---|
| | | | | POSITION | COMPONENT NUMBER | | | |
| 3/28 12:25:30 | COMPONENT REPLENISHMENT | L1 | M6R | S1 | aa1 | OP5 | 0 | 115 SECONDS |
| 3/28 12:26:10 | COMPONENT SHORTAGE | L2 | M9R | T1 | ee1 | OP1 | 125 SECONDS | 55 SECONDS |
| 3/28 12:26:40 | SUCTION ERROR | L2 | M7F | S12 | bb5 | — | 0 | 12 SECONDS |
| 3/28 12:28:20 | SUCTION ERROR | L3 | M7R | S21 | cc4 | — | 0 | 10 SECONDS |
| 3/28 12:29:50 | SUCTION ERROR | L1 | M9R | T2 | ee2 | OP1 | 105 SECONDS | 60 SECONDS |
| 3/28 12:30:10 | PRINTING ERROR | L2 | M3 | — | — | OP10 | 240 SECONDS | 210 SECONDS |
| 3/28 12:35:30 | JAMMING | L2 | M8F | S8 | dd3 | OP12 | 130 SECONDS | 95 SECONDS |
| ... | ... | ... | ... | ... | ... | ... | ... | ... |
| ↑ | ↑ | ↑ | ↑ | ↑ | ↑ | ↑ | ↑ | ↑ |
| 81 | 82 | 83 | 84 | 85 | 86 | 87 | 88 | 89 |

FIG. 10A

TOTAL PRODUCTION NUMBER : 15,000

| | PRODUCTION DATE | 4/1 | 4/2 | 4/3 | 4/4 | 4/5 |
|---|---|---|---|---|---|---|
| [FIRST VALUE] 06 O'CLOCK TO 14 O'CLOCK | PRODUCIBLE NUMBER | 1300 | 1300 | 1300 | 1300 | — | ← 91a |
| | OPERATOR NUMBER | 8 | 9 | 9 | 8 | — | ← 91b |
| [SECOND VALUE] 14 O'CLOCK TO 22 O'CLOCK | PRODUCIBLE NUMBER | 1300 | 1200 | 1300 | 1300 | — | ← 92a |
| | OPERATOR NUMBER | 8 | 9 | 8 | 8 | — | ← 92b |
| [THIRD VALUE] 22 O'CLOCK TO 06 O'CLOCK | PRODUCIBLE NUMBER | 1300 | 1200 | 1300 | 900 | — | ← 93a |
| | OPERATOR NUMBER | 8 | 9 | 9 | 8 | — | ← 93b |

FIG. 10B

| PRODUCTION DATE | | 4/1 | 4/2 | 4/3 | 4/4 | 4/5 |
|---|---|---|---|---|---|---|
| [FIRST VALUE] 06 O'CLOCK TO 14 O'CLOCK | OPTIMUM PRODUCTION NUMBER | 1000 | 1000 | 1000 | 1000 | 1000 | ← 94a
| | OPERATOR NUMBER | 6 | 6 | 6 | 6 | 6 | ← 94b
| [SECOND VALUE] 14 O'CLOCK TO 22 O'CLOCK | OPTIMUM PRODUCTION NUMBER | 1000 | 1000 | 1000 | 1000 | 1000 | ← 95a
| | OPERATOR NUMBER | 6 | 6 | 6 | 6 | 6 | ← 95b
| [THIRD VALUE] 22 O'CLOCK TO 06 O'CLOCK | OPTIMUM PRODUCTION NUMBER | 1000 | 1000 | 1000 | 1000 | 1000 | ← 96a
| | OPERATOR NUMBER | 6 | 6 | 6 | 6 | 6 | ← 96b

TOTAL PRODUCTION NUMBER : 15,000

FIG. 12

| | PRODUCTION DATE | 4/1 | 4/2 | 4/3 | 4/4 | 4/5 | |
|---|---|---|---|---|---|---|---|
| [FIRST VALUE] 06:00~ 14:00 | PRODUCTION SCHEDULED NUMBER | 1000 | 1000 | 1000 | 1000 | 1000 | ← 101a |
| | BELONGING GROUP | A GROUP | A GROUP | A GROUP | B GROUP | B GROUP | ← 101b |
| | OPERATOR NUMBER | 5 | 4 | 5 | 5 | 6 | ← 101c |
| [SECOND VALUE] 14:00~ 22:00 | PRODUCTION SCHEDULED NUMBER | 1000 | 900 | 1000 | 1000 | 800 | ← 102a |
| | BELONGING GROUP | B GROUP | B GROUP | C GROUP | C GROUP | C GROUP | ← 102b |
| | OPERATOR NUMBER | 4 | 5 | 6 | 5 | 5 | ← 102c |
| [THIRD VALUE] 22:00~ 06:00 | PRODUCTION SCHEDULED NUMBER | 800 | 900 | 1000 | 1000 | 800 | ← 103a |
| | BELONGING GROUP | C GROUP | D GROUP | D GROUP | D GROUP | A GROUP | ← 103b |
| | OPERATOR NUMBER | 4 | 5 | 6 | 5 | 4 | ← 103c |

FIG. 13A

| PRODUCTION DATE | 4/1 |
|---|---|
| WATCH TIME | FIRST VALUE |
| BELONGING GROUP | A GROUP |

| OPERATOR ID | ASSIGNMENT RANGE |
|---|---|
| OP1 | L1R, L1F, L2R |
| OP5 | L1R |
| OP10 | L2F, L3R, L3F |
| OP12 | L2F |
| OP21 | L3R |

111 { (Operator ID column) } 112 (Assignment Range column)

FIG. 13B

| OPERATOR ID | ASSIGNMENT RANGE | | WORK LEVEL |
| --- | --- | --- | --- |
| | LINE ID | DEVICE ID | |
| OP1 | L1 | M1R | SUPPORT |
| | L1 | M6R~M9R | SUPPORT |
| | L1 | M14R | SUPPORT |
| | L1 | M1F~M14F | MAIN |
| | L2 | M1R | MAIN |
| | L2 | M6R~M9R | MAIN |
| | L2 | M14R | MAIN |
| OP5 | L1 | M1R | MAIN |
| | L1 | M6R~M9R | MAIN |
| | L1 | M14R | MAIN |
| OP10 | L2 | M1F | SUPPORT |
| ⋮ | ⋮ | ⋮ | ⋮ |
| ↑ | ↑ | ↑ | ↑ |
| 111 | 112a | 112b | 113 |

APPARATUS AND METHOD FOR ESTIMATING PRODUCTION CAPACITY

BACKGROUND

1. Technical Field

The present disclosure relates to an apparatus and a method for estimating a production capacity of assembly boards in a component mounting line.

2. Description of the Related Art

In a component mounting line configured such that a plurality of component-mounting-relevant devices such as a solder printing device, a printing inspection device, a component mounter, a mounting inspection device, and a reflow device is coupled, assembly boards obtained by mounting components on boards are produced. When the assembly boards are produced in such a component mounting line, a method (production capacity examination algorithm) of estimating production capacity (such as the number of assembly boards capable of being produced for one day) of the assembly boards through simulation based on a mounting takt (a time necessary to mount the components on the board) of each component, the number of components mounted on the board, and a loading time (loading time or unloading time) of the board has been suggested (for example, see Japanese Patent Unexamined Publication No. 10-84197).

SUMMARY

A production-capacity estimation apparatus estimates a production capacity of a component mounting line for producing boards, the component mounting line including component-mounting-relevant devices coupled to one another placed on a floor. The component-mounting-relevant devices include a component mounter. The apparatus includes a memory, an input unit, and a production-capacity estimator. The memory stores floor-disposition information, production-lot information, and event information. The floor-disposition information relates to a disposition of the component mounting line on the floor. The production-lot information relates to a time necessary for the component-mounting-relevant devices to produce the assembly boards. The event information relates to an event indicating that a work of an operator is necessary for the component-mounting-relevant devices and an occurrence frequency indicating the number of occurrences of the event. The input unit receives operator information and production-plan information. The operator information relates to the operator, the production-plan information relating to a production plan for producing the assembly boards scheduled in the component mounting line. The production-capacity estimator estimates, based on the floor-disposition information, the production-lot information, the event information, the operator information, and the production-plan information, a production capacity of the component mounting line for producing the assembly boards according to the production plan.

The apparatus can estimate the production capacity of the assembly boards in the component mounting line precisely.

BRIEF DESCRIPTION OF THE DRAWINGS

FIG. 4 is an explanatory diagram showing an example of production-lot information stored in a management computer included in the component mounting system according to the exemplary embodiment of the present disclosure;

FIG. 5 is an explanatory diagram showing an example of event information stored in the management computer included in the component mounting system according to the exemplary embodiment of the present disclosure;

FIG. 6 is an explanatory diagram showing an example of operator information stored in the management computer included in the component mounting system according to the exemplary embodiment of the present disclosure;

FIG. 7 is an explanatory diagram showing an example of production-plan information stored in the management computer included in the component mounting system according to the exemplary embodiment of the present disclosure;

FIG. 8 is an explanatory diagram showing an example of production-performance information stored in the management computer included in the component mounting system according to the exemplary embodiment of the present disclosure;

FIGS. 10A and 10B are explanatory diagrams showing an example of a production capacity estimated in the component mounting system according to the exemplary embodiment of the present disclosure;

FIG. 12 is an explanatory diagram showing an example of assignment of operators to be determined in the component mounting system according to the exemplary embodiment of the present disclosure;

FIGS. 13A and 13B are explanatory diagrams showing an example of the assignment of operators to be determined in the component mounting system according to the exemplary embodiment of the present disclosure;

DETAILED DESCRIPTION

In the related art including Japanese Patent Laid-Open Publication No. 10-84197, an estimated production capacity refers to capacity in an ideal state in which the component mounting line runs without being stopped due to the component shortage or the device trouble, and there may be an error between actual production performance and the estimated production capacity of the component mounting line.

Figure 1:
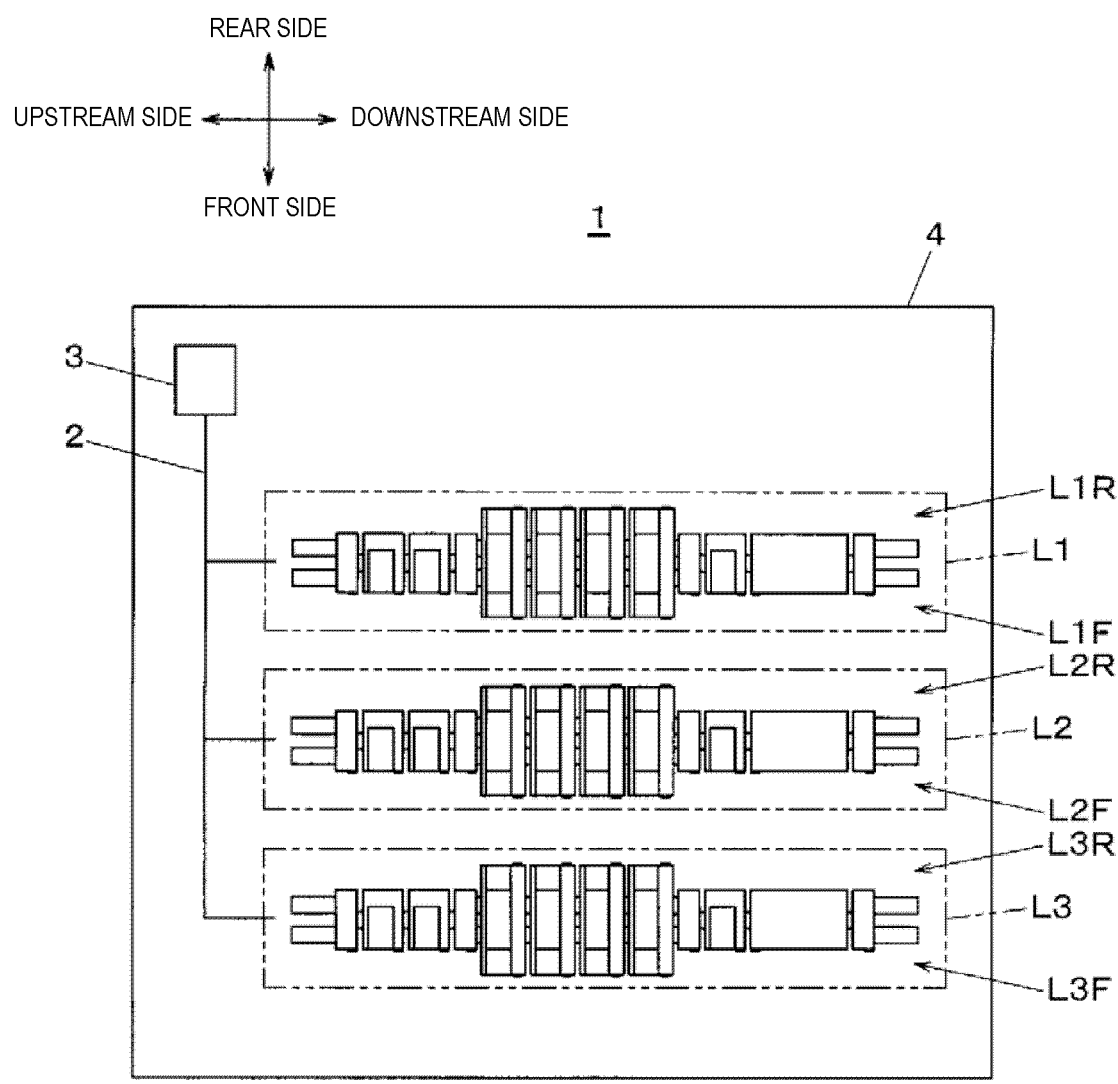
FIG. 1 is an explanatory diagram of a configuration of a component mounting system according to an exemplary embodiment of the present disclosure.
Figure 2:
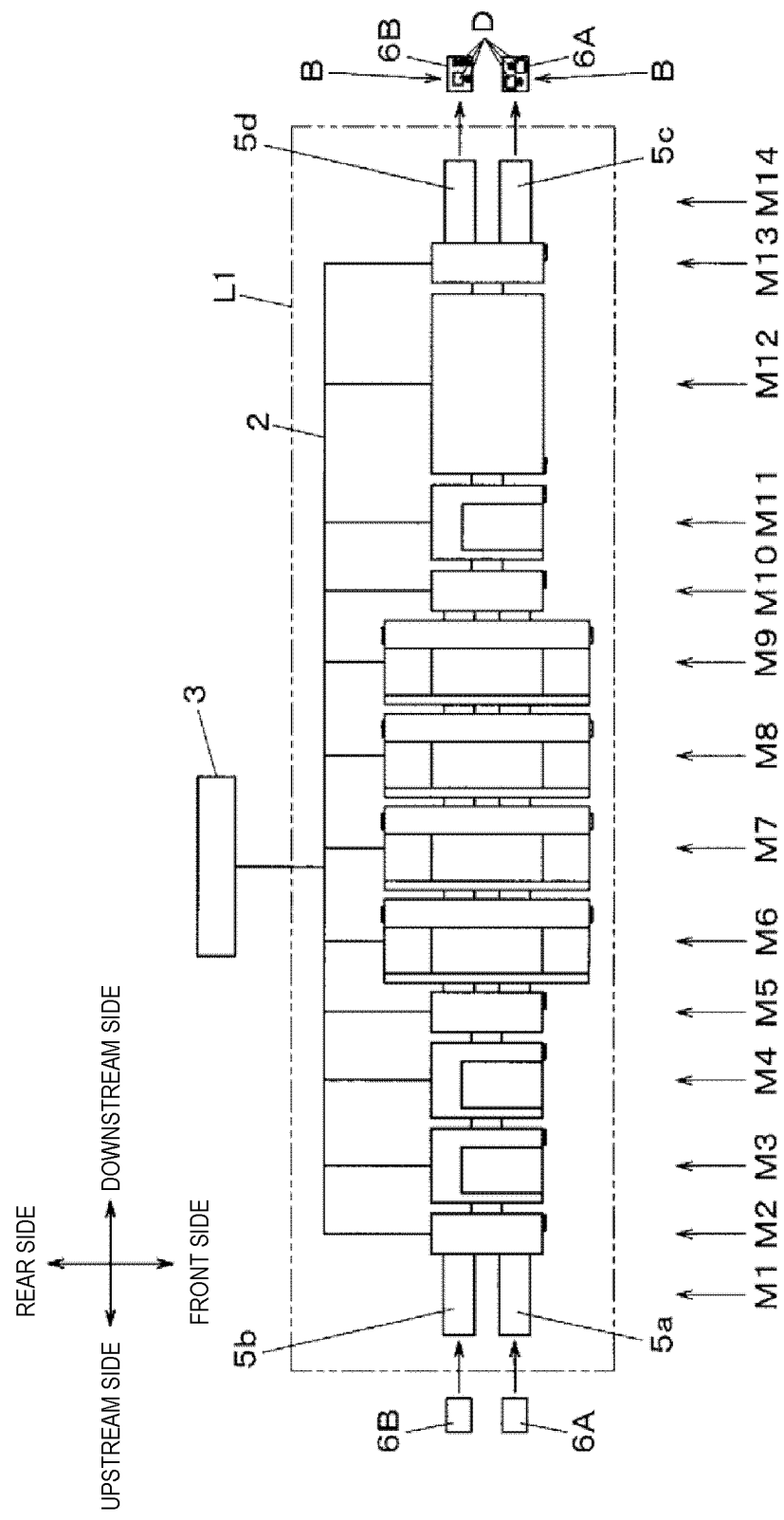
FIG. 2 is an explanatory diagram of a configuration of a component mounting line included in the component mounting system according to the exemplary embodiment of the present disclosure.

Hereinafter, an exemplary embodiment of the present disclosure will be described in detail with reference to the drawings. Configurations and shapes to be described below are examples for description, and may be appropriately modified depending on specifications of a component mounting system and a component mounting line. Hereinafter, corresponding elements in all the drawings will be assign the same reference numerals, and redundant description thereof will be omitted. In FIGS. 1 and 2, it is assumed that a left side of a paper is an upstream side and a right side is a downstream side in a board transport direction (horizontal direction in FIGS. 1 and 2). In FIGS. 1 and 2, it is assumed that a lower side of the paper is a front side and an upper side is a rear side in a direction (vertical direction in FIGS. 1 and 2) perpendicular to the board transport direction in a horizontal plane.

Initially, a configuration of component mounting system 1 will be described with reference to FIG. 1. Component mounting system 1 is configured such that three component mounting lines L1 to L3 are connected via communication network 2 and are managed by management computer 3. As will be described below, component mounting lines L1 to L3 are respectively configured such that a plurality of component-mounting-related devices each including a component mounter is coupled, and has a function of producing assembly boards obtained by mounting components on boards. Component mounting lines L1 to L3 include component mounting lanes L1F to L3F and component mounting lanes L1R to L3R each having a function of producing assembly boards, on the front side and the rear side.

Three component mounting lines L1 to L3 are placed on floor 4 in parallel such that component mounting lane L1F on the front side of component mounting line L1 and component mounting lane L2R on the rear side of component mounting line L2 face each other and component mounting lane L2F on the front side of component mounting line L2 and component mounting lane L3R on the rear side of component mounting line L3 face each other. Although it has been described in the example shown in FIG. 1 that management computer 3 is placed within floor 4 on which component mounting lines L1 to L3 are placed, management computer 3 may be placed outside floor 4. The number of component mounting lines L1 included in component mounting system 1 may not be three, and may be one or four or more. The number of component mounting lanes included in component mounting lines L1 to L3 may not be two on the front side and the rear side, and may be one.

Hereinafter, the detailed configurations of component mounting lines L1 to L3 will be described with reference to FIG. 2. Component mounting lines L1 to L3 have the same configuration, and hereinafter, component mounting line L1 will be described. Component mounting line L1 is configured such that board supply device M1, board distribution device M2, solder printing device M3, printing inspection device M4, board distribution device M5, component mounters M6 to M9, board distribution device M10, mounting inspection device M11, reflow device M12, board distribution device M13, and board collection device M14 are coupled in series toward the downstream side from the upstream side in the board transport direction.

Board distribution device M2, solder printing device M3, printing inspection device M4, board distribution device M5, component mounters M6 to M9, board distribution device M10, mounting inspection device M11, reflow device M12, and board distribution device M13 are connected to management computer 3 via communication network 2. Board supply device M1 includes two conveyors 5a and 5b on the front side and the rear side, and conveyors 5a and 5b have a function of delivering different types of supplied board 6A and board 6B to board distribution device M2 on the downstream side. Board 6A and board 6B may be the same type of boards.

In FIG. 2, board distribution devices M2, M5, M10, and M13 are component-mounting-related devices that respectively include transport conveyors which are board distribution work units (work units) and conveyor movement mechanisms that move the transport conveyors between the front side and the rear side, and perform board distribution works (component-mounting-related works) of distributing and delivering boards 6A and 6B received from the component-mounting-related device on the upstream side to the component-mounting-related device on the downstream side. Board distribution devices M2 and M10 receive boards 6A and 6B from two conveyors on front side and the rear side which are coupled onto the upstream side into the transport conveyor, move the transport conveyor having boards 6A and 6B held thereon, and sequentially deliver the boards to one conveyor coupled to the downstream side. Information relating to the order of boards 6A and 6B delivered to the downstream side is transmitted to management computer 3 from a built device communicator via communication network 2.

Board distribution devices M5 and M13 receive boards 6A and 6B from one conveyor coupled to the upstream side into the transport conveyor, move the transport conveyor having boards 6A and 6B held thereon, and distribute and deliver the boards to two conveyors on the front side and the rear side coupled to the downstream side. When the boards are delivered into the downstream side, board 6A and board 6B which are transported while being mixed from the upstream side are distributed to a predetermined conveyor on the front side or the rear side based on the information relating to the order of boards 6A and 6B which is transmitted from management computer 3 via communication network 2 and is received by a built management communicator.

In FIG. 2, solder printing device M3 is a component-mounting-related device that performs a solder printing work (component-mounting-related work) of printing solder on boards 6A and 6B serving as mounting targets by the solder printing work unit (work unit). In solder printing device M3, if accommodated solder is consumed and used up for a period during which the solder printing work is repeated and continued (if solder shortage occurs), a solder replenishment work is performed by operator OP. In set-up changing of changing assembly boards to be produced, a replacement work of a solder printing mask or an disposition changing work of lower receiving pins for supporting boards 6A and 6B from below at the time of solder printing is performed by operator OP in solder printing device M3.

Printing inspection device M4 is a component-mounting-related device that performs a printing inspection work (component-mounting-related work) for inspecting a state of solder printed on boards 6A and 6B by a printing inspection work unit (work unit) including a solder inspection camera. Component mounters M6 to M9 are component-mounting-related devices that perform a component mounting work (component-mounting-related work) for placing components D on board 6A and board 6B by a component mounting work unit (work unit) including two conveyors on the front side and the rear side, two component suppliers, and two mounting heads. In component mounters M6 to M9, two conveyors extending in the board transport direction are placed on the front side and the rear side in parallel, and two component suppliers are placed on the outside (on the front side and the rear side) of two conveyors placed in parallel.

The component supplier includes a plurality of tape feeders that feeds components D by feeding a carrier tape that holds components D and a tray feeder that feeds components D while replacing trays that hold plural components D, and supplies components D up to a pick-up position of the mounting head. The mounting head includes suction nozzle that vacuum-sucks components D, and picks up components D supplied by the component supplier. The mounting head sends and places components on boards 6A and 6B which are transported by the conveyor and are positioned and held. The carrier tape or the tray that holds predetermined components D are set onto (components D are disposed on) the tape feeder and the tray feeder of the component supplier at the time of the set-up changing such that predetermined components D are supplied depending on the types of assembly boards to be produced.

In component mounters M6 to M9, if components D held by component supplier are consumed for a period during which the component mounting work is repeated and continued and the number of components is less than a predetermined remaining number if a component shortage warning occurs) or if components D are used up (if component shortage occurs), a replenishment work of components D (replenishment of the carrier tape or replacement of the tray) is performed by operator OP. If a device error meaning that component mounters M6 to M9 are stopped, such as a suction error meaning that the suction nozzle does not normally suck components D or a feeding stop error of components D from the taper feeder due to tangling (jamming) of the carrier tape, occurs, a recovery work from the device error is performed by operator OP. In the set-up changing of changing assembly boards to be produced, a replacement work of the tape feeder, a replacement work of the tray, a replacement work of the suction nozzle, or an disposition changing work of lower receiving pins for supporting boards 6A and 6B from below at the time of mounting the components is performed by operator OP in component mounters M6 to M9.

When the above-described work is performed, operator OP moves operation surfaces (front sides or rear sides) of component mounters M6 to M9 as working targets, and does the work. As the device error, there are a device error meaning that only the component mounting work performed on any one of the front side and the rear side on which the device error occurs is stopped and the component mounting work is continuously performed on the other side without being stopped, or a device error indicating that component mounters M6 to M9 are automatically recovered by performing a recovery process. The number of component mounters M6 to M9 in component mounting line L1 is not limited to four, and the number of component mounters M6 to M9 may be one or may be five or more.

In FIG. 2, mounting inspection device M11 is a component-mounting-related device that performs a mounting inspection work (component-mounting-related work) for inspecting states of components D placed on boards 6A and 6B by a mounting inspection work unit (work unit) including a component inspection camera. Reflow device M12 is a component-mounting-related device that performs a board heating work (component-mounting-related work) for heating boards 6A and 6B loaded into the reflow device by using a board heater (work unit), cures the solder on boards 6A and 6B, and performs that bonds components D to electrodes of boards 6A and 6B. Board collection device M14 includes two conveyors 5c and 5d on the front side and the rear side, and conveyors 5c and 5d have a function of receiving and collecting boards 6A and 6B from board distribution device M13 on the upstream side.

As stated above, in component mounting line L1, components D are mounted on board 6A supplied to conveyor 5a on the front side of board supply device M1, and board 6A on which components D are mounted is collected by conveyor 5c on the front side of board collection device M14. This path serves as component mounting lane L1F on the front side. Similarly, in component mounting line L1, components D are mounted on board 6B supplied to conveyor 5b on the rear side of board supply device M1, and board 6B on which components D are mounted is collected by conveyor 5d on the rear side of board collection device M14. This path serves as component mounting lane L1R on the rear side. Hereinafter, board 6A on which components D are mounted and board 6B on which components D are mounted are simply referred to as "assembly boards B".

Operation surfaces of the component-mounting-related devices on which operator OP does the work may be the front side or the rear side depending on the configurations of the component-mounting-related devices and the disposition thereof in component mounting line L1. In the present exemplary embodiment, it is assumed that the operation surfaces of board distribution devices M2, M5, M10, and M13, solder printing device M3, printing inspection device M4, mounting inspection device M11, and reflow device M12 may be only the front side. The operation surfaces of component mounters M6 to M9 are both the front side and the rear side. Hereinafter, in a case where the front side and the rear side are distinguished from each other, "F" is assigned to the end of the reference numeral like M6F in a case where the operation surface is the front side, and "R" is assigned to the end of the reference numeral like M6R in a case where the operation surface is the rear side.

Hereinafter, a configuration of a control system of component mounting system 1 will be described with reference to FIG. 3. Component mounting lines L1 to L3 included in component mounting system 1 have the same configuration, and hereinafter, component mounting line L1 will be described. The component-mounting-related devices included in component mounting line L1 have the same configuration, and hereinafter, component mounter M6 will be described.

Component mounter M6 includes work controller 20, work unit 21, mounter memory 22, mounter input unit 23, mounter display 24, and mounter communicator 25. Work controller 20 controls the component mounting work of component mounter M6 by controlling work unit 21 based on component-mounting-related data stored in mounter memory 22. Work controller 20 controls board distribution works in board distribution devices M2, M5, M10, and M13, a solder printing work in solder printing device M3, a printing inspection work in printing inspection device M4, a mounting inspection work in mounting inspection device M11, and a board heating work in reflow device M12.

Mounter input unit 23 is an input device such as a keyboard, a touch panel, or a mouse, and is used when operator OP inputs an operation command or data. Mounter display 24 is a display device such as a liquid crystal panel, and displays various screens such as an operation screen for performing an operation using mounter input unit 23. Mounter communicator 25 is a communication interface, and transmits and receives signals and data to and from another component-mounting-related device or management computer 3 via communication network 2.

Figure 3:
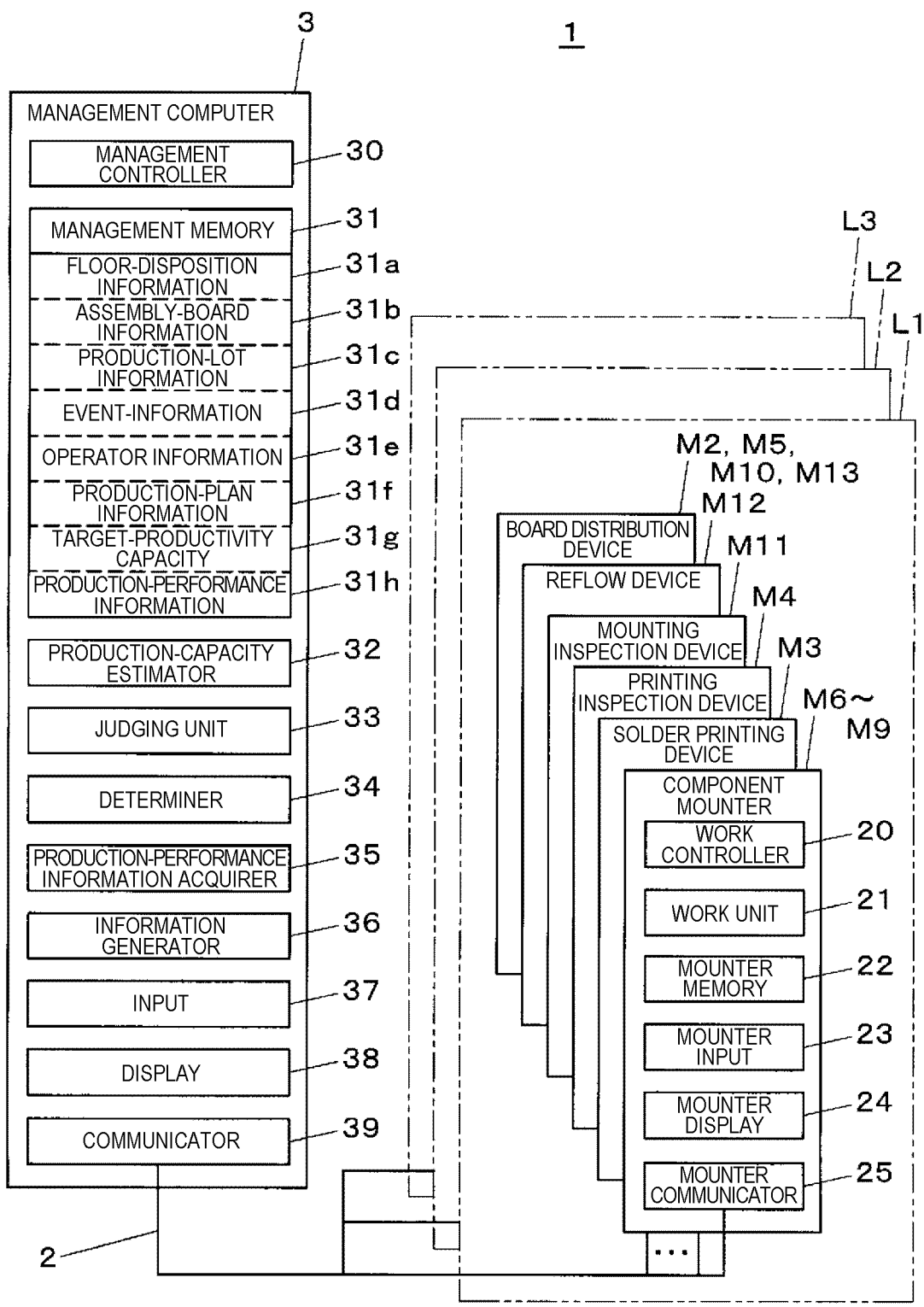
FIG. 3 is a block diagram showing a configuration of a control system of the component mounting system according to the exemplary embodiment of the present disclosure.

In FIG. 3, management computer 3 includes management controller 30, management memory 31, production-capacity estimator 32, judging unit 33, determiner 34, production-performance information acquirer 35, information generator 36, input unit 37, display 38, and communicator 39. Input unit 37 is an input device such as a keyboard, a touch panel, or a mouse, and is used when the operator inputs an operation command or data. Display 38 is a display device such as a liquid crystal panel, and displays various information items in addition to various screens such as an operation screen for performing an operation using input unit 37. Communicator 39 is a communication interface, and transmits and receives signals or data to and from component-mounting-related devices of component mounting lines L1 to L3 via communication network 2.

Management controller 30 is an arithmetic logic unit such as a CPU, and manages component mounting system 1 based on information stored in management memory 31. Management memory 31 is a memory device, and stores floor-disposition information 31a, assembly-board information 31b, production-lot information 31c, event information 31d, operator information 31e, production-plan information 31f, target production capacity 31g, and production-performance information 31h in addition to component mounting data.

Floor-disposition information 31a is information relating to the disposition of component-mounting-related devices included in component mounting lines L1 to L3 on floor 4 or the disposition of objects, such as a pillar and a workbench, which are obstacles when operator OP moves within floor 4. Assembly-board information 31b is information relating to assembly boards B to be produced in component mounting lines L1 to L3, and is stored such that each assembly board B is associated with the type and mounting position of component D to be mounted on the board.

In production-lot information 31c, the disposition of components D set onto the component suppliers of component mounters M6 to M9, the remaining number of set components D, and device takt times Tt which are standard processing times required in the component-mounting-related works of the component-mounting-related devices are stored for each component-mounting-related device and each lot of assembly board B to be produced. That is, production-lot information 31c includes information relating to times (device takt times Tt) necessary for the component-mounting-related devices of component mounting lines L1 to L3 to produce assembly boards B.

Here, production-lot information 31c will be described in detail by referring to the example shown in FIG. 4. In production-lot information 31c, the configurations of component mounting lines L1 to L3 and standard device takt times Tt of the component-mounting-related devices in these configurations are represented in "TAKT TIME" field 46 so as to correspond to a lot represented in "LOT ID" field 41 which is a production unit when assembly board B represented in "ASSEMBLY BOARD" field 42 is produced. In this example, device takt times Tt in a case where the component-mounting-related devices of component mounting line L1 represented in "LINE ID" field 47 produce assembly boards B are represented. Device takt time Tt may be stored by being distinguished between loading times of boards 6A and 6B, a time required in the component-mounting-related work of work unit 21, and an unloading time of boards 6A and 6B.

The configuration of the component-mounting-related device is specified by a device ID (type) of the component-mounting-related device represented in "DEVICE ID" field 43. In component mounters M6 to M9, the conveyor (on the rear side in this example) on which assembly board B is produced by the device ID. Disposition position S of the tape feeder or tray position T of the tray feeder are represented in "POSITION" field 44, and the type of component D to be supplied is represented in "COMPONENT NUMBER" field 45. Device takt times Tt in the respective component-mounting-related device of the respective lots depend on the configurations of the component-mounting-related devices of component mounting lines L1 to L3 that produce the assembly boards and the disposition of components D of component mounters M6 to M9. In a case where high precision is required in estimated production capacity Cm, plural production-lot information items 31c of which the dispositions of components D or component mounting lines L1 to L3 are different are prepared.

In FIG. 3, event information 31d is information relating to an event occurring during the component-mounting-related works of component mounting lines L1 to L3. Event information 31d includes a device error meaning that a replenishment work of a component (solder or component D) consumed in the component-mounting-related device or a component mounting work in the component-mounting-related device is temporarily stopped.

Here, event information 31d will be described in detail by referring to the example shown in FIG. 5. Distinction of whether the event is the replenishment work or the device error is represented in "MAJOR ITEM" field 51a of the event content. In a case where the event is the replenishment work, distinction between the replenishment of the solder in solder printing device M3, and the replenishment of the carrier tape (tape replenishment) and replacement of the tray (tray replacement) in component mounters M6 to M9 is represented in "MEDIUM ITEM" field 51b. In a case where the replenishment work is the tape replenishment or the tray replacement, the tape feeder as a replenishing target or the type of component D for specifying the tray feeder is represented in "MINOR ITEM" field 51c.

In FIG. 5, in a case where the event is the device error, distinction of whether or not the device error is a printing error meaning that the solder printing is not normally performed in solder printing device M3, a suction error meaning that the suction nozzle does not normally suck components D in component mounters M6 to M9, or jamming that the carrier tape is tangled in the tape feeder is represented in "MEDIUM ITEM" field 51b. In a case where the device error is the suction error or the jamming, the type of component D for specifying the tape feeder or the tray feeder as a target of the recovery work is represented in "MINOR ITEM" field 51c. In "occurrence frequency" field 52, occurrence frequency Fe indicating the number of occurrences of the device error is represented in a unit of ppm (one millionth).

A mark ("o") indicating that the device error is able to be automatically recovered by the process of the device or a mark ("x") indicating that the work is needed to be performed by operator OP is represented in "AUTOMATIC RECOVERY" field 53. For example, an automatic recovery for trying to suck relatively small components (aa1 and aa3) supplied by the tape feeder again by component mounters M6 to M9 is performed at the time of the occurrence of the suction error. Meanwhile, a recovery work of relatively large and high-price components (aa1 and aa3) supplied by the tray feeder is performed while operator OP checks the state at the time of the occurrence of the suction error.

In FIG. 5, standard work time Tw by operator OP for each event or standard recovery time Tr required in the automatic recovery process by component mounters M6 to M9 is represented in "work time/recovery time" field 54. Information represented in "MINOR ITEM" field 51c may be the tape feeder as the working target, information of the combination of the device ID for specifying the tray feeder and disposition position S or tray position T, or an ID of the tape feeder or the tray feeder, in addition to the type of component D.

As stated above, the event of event information 31d indicating that the work of operator OP is necessary includes at least any one of the shortage of the component including the component shortage or a component-shortage warning in component mounters M6 to M9 and the device error meaning that the component-mounting-related device is stopped. The device error of event information 31d includes information relating to the event indicating that the work of operator OP is necessary for the component-mounting-related devices of the component mounting lines L1 to L3 and occurrence frequency Fe indicating the number of occurrences of the event and information relating to the event indicating that the work of operator OP is not necessary but the process (automatic recovery) of resuming the stopped production of assembly boards B is necessary and occurrence frequency Fe indicating the number of occurrences of the event.

In FIG. 3, operator information 31e is information relating to operator OP who executes a work for producing assembly boards B in component mounting lines L1 to L3, and includes at least any one of work ability and a work schedule of operator OP, an assignment range of the operator on the floor, and a movement speed of operator OP.

Here, operator information 31e will be described in detail by referring to the example shown in FIG. 6. IDs (OP1 to OP5) for specifying operators OP represented in "OPERATOR ID" field 61 are assigned to operators OP. Information relating to the work ability of operator OP is included in "REPLENISHMENT WORK AND REPLACEMENT WORK" field 62, "DEVICE ERROR RECOVERY WORK" field 63, "SET-UP CHANGING WORK" field 64, and "MOVEMENT SPEED" field 65.

In FIG. 6, a proficiency level of operator OP in the replenishment work of the component-mounting-related device is represented as four levels of A (advanced level), B (intermediate level), C (beginning level), and x (inability to work) in "REPLENISHMENT WORK AND REPLACEMENT WORK" field 62. Specifically, the proficiency levels in the replenishment and replacement work of the solder in solder printing device M3, the replenishment and replacement work of the carrier tape of the tape feeder in component mounters M6 to M9, and the replacement work of the tray of the tray feeder are represented. In a case where the works are all the same, the proficiency level shows that work time Tw during which the work is performed by operator OP having advanced level (A) is shorter than a time during which the work is performed by operator OP having intermediate level (B), work time Tw during which the work is performed by operator OP having intermediate level (B) is shorter than a time during which the work is performed by operator OP having beginning level (C), and operator OP having inability to work (x) does not have ability to do the work.

The proficiency level of each operator OP in the recovery work from the device error of the component-mounting-related device is represented as two levels of o (ability to work) and x (inability to work) in "DEVICE ERROR RECOVERY WORK" field 63. Specifically, the proficiency levels in the recovery work from the device error in solder printing device M3, the recovery work from the suction error meaning that the suction nozzle does not normally suck components D, the recovery work from the feeding stop error due to the jamming of the carrier tape in the tape feeder, and the recovery work from the feeding stop error in the tray feeder are represented. The proficiency level of each operator OP in the set-up changing of the component-mounting-related device is represented as two levels of o (ability to work) and x (inability to work) in "SET-UP CHANGING WORK" field 64.

In FIG. 6, the movement speed of each operator OP within floor 4 is represented as three levels of A (fast), B (normal), and C (slow) in "MOVEMENT SPEED" field 65. Operator OP having a fast movement speed may move up to the component-mounting-related device as the working target within a shorter time. Work groups (four groups of A group to D group) to which operators OP belong and scheduled dates of leaves of absence are represented in "WORK SCHEDULE" field 66.

Specifically, the assignment range on the floor included in operator information 31e is information for specifying the component-mounting-related device assigned to each operator OP, and is shown in FIGS. 13A and 13B. For example, in FIGS. 13A and 13B, an assignment range of operator OP1 includes all the component-mounting-related devices having component mounting lane L1R on the rear side of component mounting line L1, component mounting lane L1F on the front side of component mounting line L1, and component mounting lane L2R on the rear side of component mounting line L2, as the operation surfaces.

For example, component mounting lane L1R on the rear side of component mounting line L1 of the assignment range of operator OP1 overlaps with the assignment range of operator OP5 who is not able to do the recovery work from the device error due to a low proficiency level. The assignment range may not include all the component-mounting-related devices of component mounting lanes L1F to L3F and L1R to L3R, and for example, different operators OP may be assigned to the component-mounting-related devices on the upstream side and the downstream side of component mounting lane L1F.

In FIG. 3, production-plan information 31f includes information relating to the production plan for producing assembly boards B scheduled in component mounting lines L1 to L3. Here, production-plan information 31f will be described in detail by referring to the example shown in FIG. 7. In production-plan information 31f, component mounting lanes L1F to L3F and L1R to L3R that produce the lots are represented in "LANE ID" field 73 so as to correspond to the lot which produces assembly boards B represented in "ASSEMBLY BOARD" field 72 and is represented in "LOT ID" field 71.

A (startable) scheduled date and time when the production of the lot is started is represented in "PRODUCTION START DATE AND TIME" field 74, the number of produced lots is represented in "LOT PRODUCTION NUMBER" field 75, and a set-up time necessary to perform the set-up changing followed by the changing of assembly boards B to be produced is represented in "SET-UP TIME" field 76. In this example, a time necessary in a case where operator OP having standard work ability does the set-up changing work by oneself is input as the set-up time. Like lot ID of AA3, in a case where the lot (AA1) most recently produced in assigned component mounting lane L1R is the same assembly board B (AA), since it is not necessary to perform the set-up changing, "–" is input in "SET-UP TIME" field 76. Production-plan information 31f may include information relating to a target due date when the production of each lot is ended.

In FIG. 3, target production capacity 31g is a target value of production capacity Cm represented by the production number of assembly boards B produced for a running time per day, the production number of assembly boards B for a predetermined running time, or a time necessary to produce a predetermined production number of assembly boards B. Target production capacity 31g is determined based on past production performance and manager's experience, and is also estimated by production-capacity estimator 32 to be described below (is estimated in a production capacity estimation stage). Production capacity Cm obtained by multiplying maximum production capacity Cm produced in component mounting lines L1 to L3 by a predetermined coefficient, such as 0.9 (90%), which is equal to or less than 1, is used. Accordingly, it is possible to determine target production capacity 31g irrespective of the experience of a manager.

In FIG. 3, production-performance information 31h includes information relating to the event transmitted from each component-mounting-related device in addition to a production situation of assembly boards B transmitted from component mounters M6 to M9 of component mounting lines L1 to L3 and the remaining number of components D held by the tape feeder or the tray feeder. Here, production-performance information 31h will be described in detail by referring to the example shown in FIG. 8. Each event occurrence date and time is represented in "EVENT OCCURRENCE DATE AND TIME" field 81, and the content of the event is represented in "EVENT CONTENT" field 82. As the event, the suction error, the printing error, and the jamming error are recorded in addition to the component replenishment indicating that it is necessary to replenish the tape feeder or the tray with components D without stopping the work in the component-mounting-related device and the component shortage indicating that it is necessary to replenish the tape feeder or the tray with the components in a state in which the works by operator OP are not performed in time and the component mounting work is stopped.

In FIG. 8, as the information for specifying the component-mounting-related device in which the event occurs, information for specifying component mounting lines L1 to L3 is represented in "LINE ID" field 83, and information for specifying the component-mounting-related device is represented in "DEVICE ID" field 84. In a case where component-mounting-related device in which the event occurs is component mounters M6 to M9, disposition position S of the tape feeder or tray position T of the tray feeder is represented in "POSITION" field 85 of the component disposition, and the type of component D is represented in "COMPONENT NUMBER" field 86. An ID of operator OP corresponding to the occurred event is represented in "OPERATOR ID" field 87. "–" is recorded in the automatically recovered event.

A time when the component-mounting-related device is stopped due to the occurred event is recorded in "DEVICE STOPPAGE TIME" field 88. Since the event such as the component replenishment or the automatically recovered suction error among the events is solved without stopping the component-mounting-related device, "0" is recorded. Work time Tw during which the work is performed by operator OP for each event or recovery time Tr necessary to perform the automatic recovery process performed by the component-mounting-related device is recorded in "WORK TIME/RECOVERY TIME" field 89.

In FIG. 3, production-capacity estimator 32 performs a production capacity estimation process of estimating production capacity Cm of component mounting lines L1 to L3 in a case where assembly boards B are produced according to the production plan to be described below based on floor-disposition information 31a, assembly-board information 31b, production-lot information 31c, event information 31d, operator information 31e, and production-plan information 31f which are stored in management memory 31. In the production capacity estimation process, production-capacity estimator 32 predicts occurrence times of various events such as prediction of an occurrence time of the component shortage from the remaining number of components D and a consumption amount of components D consumed according to the production of assembly boards B and prediction of an occurrence time of the device error from occurrence frequency Fe of the device error.

Subsequently, production-capacity estimator 32 selects operator OP that can most quickly arrive in the target device from the assignment range of operator OP, the movement speed, the floor-disposition, and the position of operator OP and the content of a work in progress at the time of the event occurrence. In this case, production-capacity estimator 32 calculates a shortest path from the current position of operator OP to the component-mounting-related device on which the operator does the recovery work, and calculates a movement time necessary for the operator to arrive in the target device based on the shortest path.

Subsequently, production-capacity estimator 32 calculates a time necessary for the operator to arrive in the target device by adding the movement time to the remaining time of the work in progress. Subsequently, production-capacity estimator 32 calculates work time Tw necessary to perform the recovery work from the content of the occurred event and the work ability of operator OP, and predicts a device stoppage time when the component-mounting-related device is stopped in consideration with the time necessary for operator OP to arrive in the target device.

Production-capacity estimator 32 adds the device stoppage time predicted as stated above to device takt time Tt necessary to perform the component-mounting-related work of each component mounter, and estimates a time (production capacity Cm) necessary to produce as many assembly boards B as the production number determined by the production plan.

Production-capacity estimator 32 estimates the production number (production capacity Cm) of assembly boards B produced for a running time per day (a time obtained by subtracting a time during which component mounting lines L1 to L3 are stopped due to the shift and rest of operator OP and maintenance of the device from 24 hours), which is determined by the production plan. Production-capacity estimator 32 estimate the production number (production capacity Cm) of assembly boards B for a predetermined running time (for example, eight hours which are a watch time).

As mentioned above, production-capacity estimator 32 estimates, as production capacity Cm, any one of the production number of assembly boards B produced for a running time per day determined by the production plan, the production number of assembly boards B for a predetermined running time, and the time necessary to produce as many assembly boards B as the production number determined by the production plan in the production capacity estimation process.

In FIG. 3, judging unit 33 compares production capacity Cm estimated by production-capacity estimator 32 with target production capacity 31g stored in management memory 31, and judges whether or not production capacity Cm is equal to or greater than target production capacity 31g. That is, judging unit 33 judges whether or not production capacity Cm estimated by production-capacity estimator 32 is equal to or greater than predetermined target production capacity 31g.

Determiner 34 determines operators OP to be assigned to the component-mounting-related devices of component mounting lines L1 and L2 based on information (operator information 31e) relating to operator OP. In this case, the determiner determines the assignment range P such that at least one operator OP who can do the replenishment work, the replacement work, and the device error recovery work of the component-mounting-related device is designated for all component-mounting-related devices of component mounting lines L1 to L3, based on the work ability of operator OP. That is, determiner 34 determines the assignment range of operator OP on floor 4.

In FIG. 3, production-performance information acquirer 35 acquires information of the occurred events in the component-mounting-related devices of component mounting lines L1 to L3 and information of the remaining amount of solder or the remaining number of components D, and stores the acquired information as production-performance information 31h in management memory 31. That is, production-performance information acquirer 35 acquires production-performance information 31h of component mounting lines L1 to L3. The acquired information may be stored in mounter memory 22 of each component-mounting-related device, or may be transmitted to management computer 3 from each component-mounting-related device during the production of assembly boards B and may be stored as production-performance information 31h in management memory 31.

Information generator 36 generates event information 31d using production-performance information 31h stored in management memory 31, and stores the generated event information in management memory 31. That is, information generator 36 generates event information 31d including information relating to the event indicating that the work of operator OP is necessary for the component-mounting-related devices of component mounting lines L1 to L3, from production-performance information 31h acquired by production-performance information acquirer 35. That is, the information generated in information generator 36 includes at least any one of occurrence frequency Fe of the component shortage of component mounters M6 to M9, work time Tw during which operator OP replenishes component mounters M6 to M9 with components D, occurrence frequency Fe of the device error meaning that the component-mounting-related device is stopped, and work time Tw during which operator OP recovers the device error.

Input unit 37 is an input device such as a keyboard, a touch panel, or a mouse, and is used for inputting data such as an operation command by the manager, information (operator information 31e) relating to operator OP, or information (production-plan information 31f) relating to the production plan for producing assembly boards B scheduled in component mounting lines L1 to L3. Display 38 is a display device such as a liquid crystal panel, and displays various screens such as an operation screen for performing an operation using input unit 37. Communicator 39 is a communication interface, and transmits and receives signals to and from component-mounting-related devices of component mounting lines L1 to L3 via communication network 2.

Figure 9:
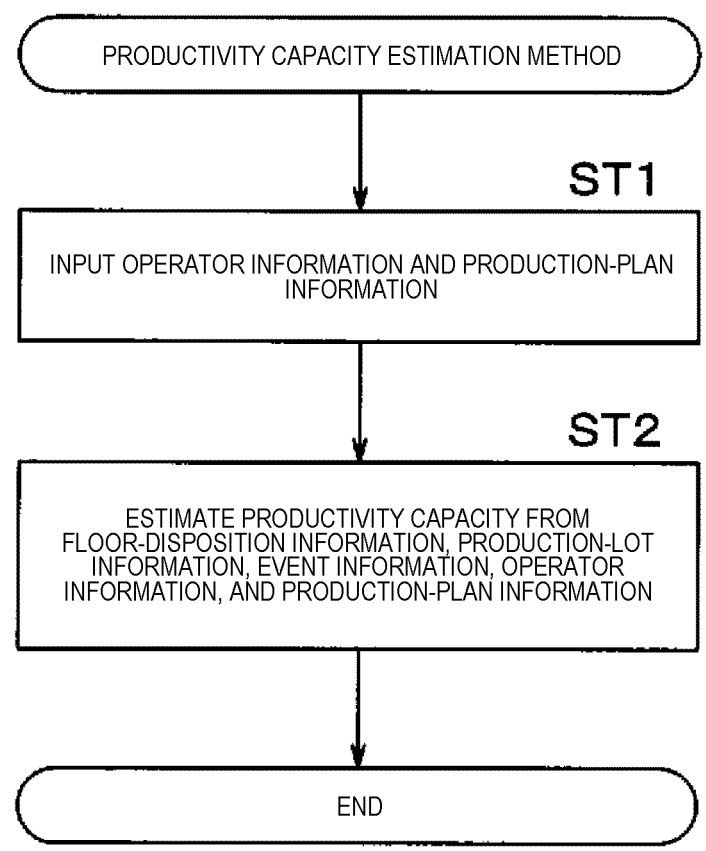
FIG. 9 is a flowchart of a production capacity estimation method in the component mounting system according to the exemplary embodiment of the present disclosure.

Next, a production capacity estimation method of estimating production capacity Cm of assembly boards B produced by component mounting lines L1 to L3 will be described with reference to FIGS. 10A and 10B according to the flow of FIG. 9. Production capacity Cm is estimated when the manager prepares the production plan in component mounting lines L1 to L3 and prepares the number of operators OP who does the work for producing required assembly boards B and the work schedule of each operator OP.

Initially, the manager inputs operator information 31e and production-plan information 31f by operating input unit 37 of management computer 3 (ST1: input stage). Accordingly, the information relating to operator OP and the information relating to the production plan for producing assembly boards B scheduled in component mounting lines L1 to L3 are input to management computer 3. Input operator information 31e and production-plan information 31f are stored in management memory 31.

Subsequently, production-capacity estimator 32 estimates production capacity Cm based on floor-disposition information 31a, assembly-board information 31b, production-lot information 31c, event information 31d, operator information 31e, and production-plan information 31f which are stored in management memory 31 (ST2: production capacity estimation stage).

That is, production capacity Cm of component mounting lines L1 to L3 in a case where assembly boards B are produced according to the production plan is estimated based on the information (floor-disposition information 31a) relating to the disposition of component mounting lines L1 to L3 on floor 4 which is stored in management memory 31 (memory), information (production-lot information 31c) relating to the time necessary for the component-mounting-related devices of component mounting lines L1 to L3 to produce assembly boards B, the information (event information 31d) relating to the event indicating that the work of operator OP is necessary for component-mounting-related devices of component mounting lines L1 to L3 and the occurrence frequency Fe thereof, the information (operator information 31e) relating to operator OP input by input unit 37, and the information (production-plan information 31f) relating to the production plan.

Operator information 31e when production capacity Cm is estimated may be information for specifying each operator OP associated with the work ability and the work schedule shown in FIG. 6, or may indicate operator OP of which the virtually defined work ability is standard without specifying operator OP. The production capacity may be estimated based on the production plan including a rest time of operator OP. The rest time may be a rest such that operators OP take rests while alternately shifting by half. In the production plan, the time obtained by subtracting the time when component mounting lines L1 to L3 are stopped due to the shift and rest of operator OP and the maintenance of the device from 24 hours per day may be defined as the running time per day during which component mounting lines L1 to L3 are operated and assembly boards B are produced.

Event information 31d may include the suction error meaning that the component-mounting-related devices are not stopped since the work of operator OP is not necessary and the devices are automatically recovered but the production of assembly boards B is temporarily stopped during the automatic recovery work, in addition to the event indicating that the work of operator OP is necessary. That is, in the production capacity estimation stage (ST2), production capacity Cm may be estimated based on the information relating to the event indicating that the work of operator OP is not necessary but the process of resuming the stopped production of assembly boards B is necessary in the component-mounting-related devices of component mounting lines L1 to L3 and occurrence frequency Fe thereof. Accordingly, it is possible to improve estimation precision of production capacity Cm.

As stated above, management computer 3 is a production capacity estimation device that includes the memory (management memory 31) which stores floor-disposition information 31a, assembly-board information 31b, production-lot information 31c, and event information 31d, input unit 37 to which operator information 31e and production-plan information 31f are input, and production-capacity estimator 32, and estimates the production capacity of assembly boards B produced by component mounting lines L1 to L3 configured such that a plurality of component-mounting-related devices including component mounters M6 to M9 is coupled.

The manager may input the number or proficiency levels of operators OP who does the work for producing assembly boards B, the assignment range on floor 4, and the type, number, or production date and time of assembly boards B to be produced (ST1), and may acquire estimated production capacity Cm by using the production capacity estimation device (ST2). The manager can prepare the production plan of assembly boards B and assign operators OP with high precision while repeating this simulation.

Here, two examples of estimated production capacity Cm will be described with reference to FIGS. 10A and 10B. In this example, operators OP do their three-shift works each day divided into a first value ranging from 6 o'clock to 14 o'clock, a second value ranging from 14 o'clock to 22 o'clock, and a third value ranging from 22 o'clock to 6 o'clock. The number of assembly boards B produced for each watch time and the number of operators OP who do the work for producing assembly boards B in a case where the production is started on April 1st and a total of 15,000 assembly boards B are produced.

FIG. 10A shows a result acquired by performing the production capacity estimation process of estimating maximum production numbers 91a, 92a, and 93a of assembly boards B capable of being produced in component mounting lines L1 to L3 without limiting operator numbers 91b, 92b, and 93b in order to minimize the stoppage of the component-mounting-related devices due to the component shortage or the device error caused by the shortage of operators OP. In this example, it is estimated that a maximum of 1300 assembly boards B are produced by operator numbers 91b, 92b, and 93b which are eight or nine for eight-hour watch time and the production is completed for a period of time indicating the third value on April 4th.

FIG. 10B shows a result acquired by performing the production capacity estimation process for minimizing operator numbers 94b, 95b, and 96b of operators OP who do the work for producing assembly boards B for each watch time under a condition in which the production numbers (optimum production numbers 94a, 95a, and 96a) of assembly boards B for each watch time are equalized on the assumption that the production is completed for a period of time indicating the third value on April 5th and the stoppage of the component-mounting-related devices is permitted if the assembly boards of the assigned optimum production numbers 94a, 95a, and 96a can be produced. In this example, it is estimated that the number of assembly boards B produced for each watch time is 1000 and the operator numbers 94b, 95b, and 96b for each watch time are six.

Next, a first management method of optimizing the assignment of operators OP who do the work for producing assembly boards B in component mounting lines L1 to L3 will be described with reference to FIGS. 12, 13A, and 13B according to the flow of FIG. 11. The assignment of operators OP is optimized when the manager determines the work schedule of operator OP who does the work for producing assembly boards B. Hereinafter, the same stages as those in the above-described production capacity estimation method will be assigned the same reference numerals, and the detailed description thereof will be omitted.

Initially, similarly to the production capacity estimation method, the production capacity estimation stage (ST2) of estimating production capacity Cm is performed by production-capacity estimator 32 based on floor-disposition information 31a, assembly-board information 31b, production-lot information 31c, event information 31d, operator information 31e, and production-plan information 31f which are stored in management memory 31. In this case, as an initial condition of operator OP who does the work for producing assembly boards B, a sufficient operator number with which the stoppage of the component-mounting-related devices caused by the shortage of operators OP is minimized is designated.

That is, production capacity Cm of component mounting lines L1 to L3 in a case where assembly boards B are produced according to the production plan is estimated based on the information (floor-disposition information 31a) relating to the disposition of component mounting lines L1 to L3 on floor 4, the information (production-lot information 31c) relating to the time necessary for component-mounting-related devices of component mounting lines L1 to L3 to produce assembly boards B, the information (event information 31d) relating to the event indicating that the work of operator OP is necessary for the component-mounting-related devices of component mounting lines L1 to L3 and occurrence frequency Fe thereof, the information (operator information 31e) relating to operator OP, and the information (production-plan information 310 relating to the production plan for producing assembly boards B scheduled in component mounting lines L1 to L3.

Subsequently, in FIG. 11, judging unit 33 judges whether or not production capacity Cm estimated in production capacity estimation stage (ST2) is equal to or greater than target production capacity 31g stored in management memory 31 (ST11: first judging stage). That is, judging unit 33 judges whether or not estimated production capacity Cm is equal to or greater than predetermined target production capacity 31g. In a case where it is judged that estimated production capacity Cm is equal to or greater than target production capacity 31g (Yes in ST11), determiner 34 determines operators OP to be assigned to the component-mounting-related devices of the component mounting lines L1 to L3 based on the information (operator information 31e) relating to operator OP (ST12: first determination stage).

Subsequently, production-capacity estimator 32 decreases the number of operators OP assigned in the first determination stage (ST12) by one person (ST13), and re-estimates production capacity Cm by performing the production capacity estimation stage (ST2). Subsequently, the first judging stage (ST11) is performed, the number of operators OP assigned in the first determination stage (ST12) is decreased one by one until it is judged that the re-estimated production capacity Cm is less than target production capacity 31g (No in ST11) (ST13), and the re-estimation of production capacity Cm for performing the production capacity estimation stage (ST2) is repeatedly performed.

Figure 11:
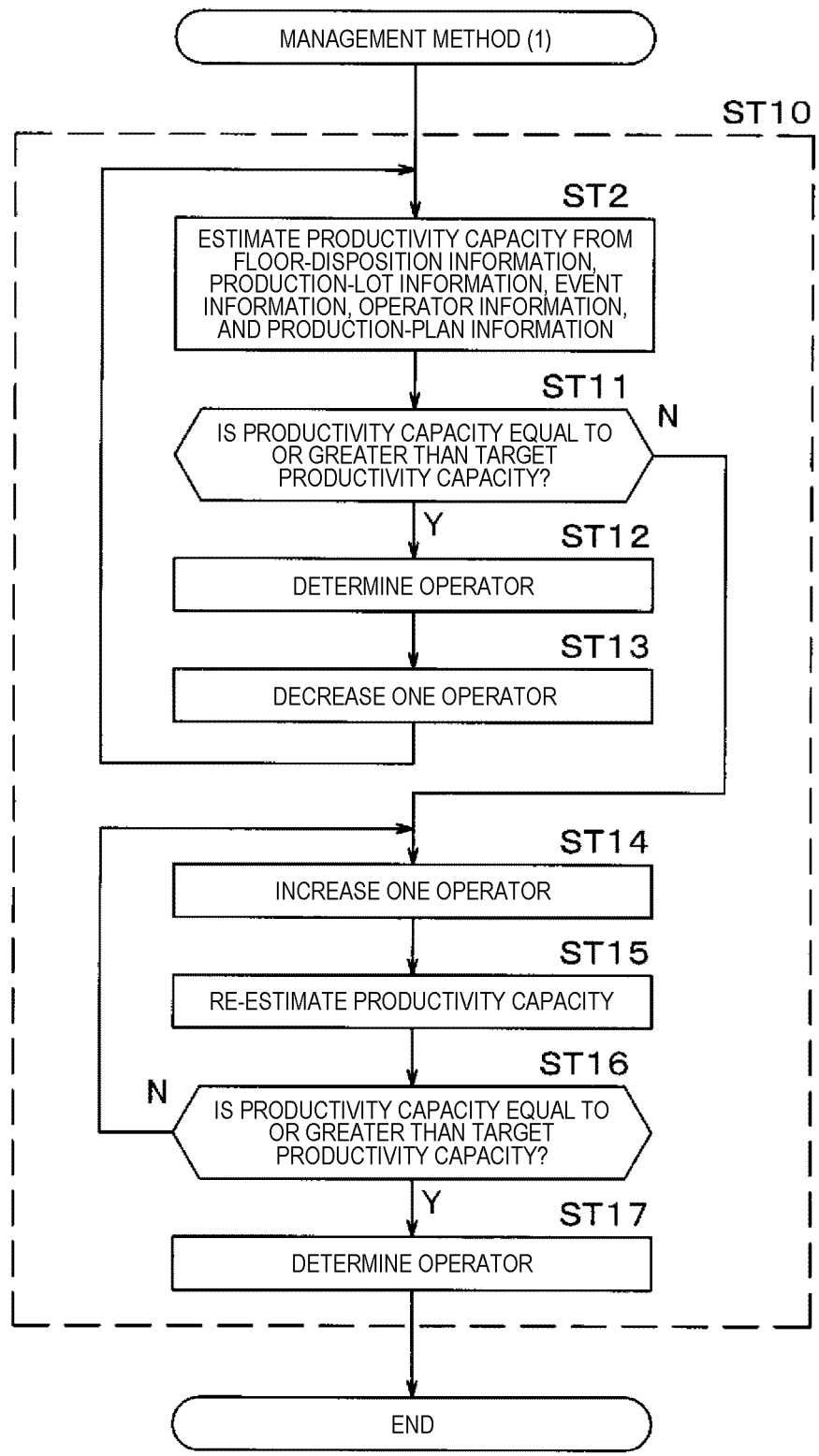
FIG. 11 is a flowchart of a first management method in the component mounting system according to the exemplary embodiment of the present disclosure.

In FIG. 11, if it is judged that re-estimated production capacity Cm is less than target production capacity 31g (No in ST11), production-capacity estimator 32 increases the number of estimated operators OP by one person (ST14), and re-estimates production capacity Cm by performing the same process as the production capacity estimation stage (ST2) (ST15). Subsequently, judging unit 33 judges whether or not re-estimated production capacity Cm is equal to or greater than target production capacity 31g stored in management memory 31 (ST16: second judging stage).

For a period of time during which it is judged that re-estimated production capacity Cm is less than target production capacity 31g (No in ST16), production-capacity estimator 32 re-estimates production capacity Cm (ST15) while increasing the number of operators OP one by one (ST14). In a case where it is judged that re-estimated production capacity Cm is equal to or greater than target production capacity 31g (Yes in ST16), determiner 34 determines operators OP to be assigned to the component-mounting-related devices of component mounting lines L1 to L3 (ST17: second determination stage).

As stated above, in a case where it is judged that production capacity Cm estimated by judging unit 33 in the first judging stage (ST11) is equal to or greater than target production capacity 31g (No), the production-capacity estimator decreases the number of operators OP and re-estimates production capacity Cm by performing the production capacity estimation stage (ST2). In the second determination stage (ST17), determiner 34 determines operators OP to be assigned to the component-mounting-related devices of component mounting lines L1 to L3 such that re-estimated production capacity Cm is equal to or greater than target production capacity 31g and the number of operators is minimized.

Accordingly, it is possible to optimize the assignment of operators OP who do the work for producing assembly boards B in component mounting lines L1 to L3. A series of stages from the production capacity estimation stage (ST2) to the second determination stage (ST17) are an operator determination stage (ST10) of determining operators OP by estimating production capacity Cm based on various information items store din management memory 31.

Here, an example of the assignment of determined operators OP will be described with reference to FIGS. 12, 13A, and 13B. In FIG. 12, operator numbers 101c, 102c, and 103c of operators OP assigned for each watch time, groups 101b, 102b, and 103b to which operators OP belong, and production scheduled number 101a, 102a, and 103a of assembly boards B are represented.

In FIG. 13A, specific operator IDs and assignment ranges (component mounting lanes L1F to L3F and L1R to L3R) of five operators OP1, OP5, OP10, OP12, and OP21 belonging to A group for a period of time indicating the first value on April 1st are represented in "OPERATOR ID" field 111 and "ASSIGNMENT RANGE" field 112 among the information items of assigned operators OP. That is, determiner 34 determines the assignment ranges of operators OP on floor 4 in the first determination stage (ST11) and the second determination stage (ST17). In FIG. 13B, a line ID and a device ID for specifying a specific component-mounting-related device to which each operator OP is assigned are represented in "LINE ID" field 112a and "DEVICE ID" field 112b, and a work level for this device is represented as "MAIN" or "SUPPORT" in "WORK LEVEL" field 113.

For example, operator OP1 having a work level of "MAIN" for the component-mounting-related device of component mounting lane L1F on the front side of component mounting line L1 preferentially does the work, but operator OP5 having a work level of "MAIN" for component mounters M6 to M9 of component mounting lane L1R on the rear side of component mounting line L1 preferentially does the work. However, in a case where the device stoppage occurs in plural component mounters M6 to M9, operator OP1 having a work level of "SUPPORT" works. Accordingly, it is possible to shorten a stoppage time of the device.

The determiner determines the operators such that operator OP1 having a work level of "MAIN" for the component-mounting-related device of component mounting lane L2R on the rear side of component mounting line L2 in addition to component mounting lane L1F on the front side of component mounting line L1 preferentially does the work. That is, in the first determination stage (ST11) and the second determination stage (ST17) of determiner 34, determiner 34 determines the operators such that at least one operator OP does the work in at least two component mounting line L1 and component mounting line L2 of plural component mounting lines L1 to L3. Since it is possible to more efficiently to perform the work for producing assembly boards B by performing the assignment in this manner, it is possible to decrease the number of required operators.

As mentioned above, management computer 3 is a management apparatus that includes the memory (management memory 31) that stores floor-disposition information 31a, assembly-board information 31b, production-lot information 31c, event information 31d, operator information 31e, and production-plan information 31f, production-capacity estimator 32, judging unit 33, and determiner 34, and optimizes the assignment of operators OP who do the work for producing assembly boards B in component mounting lines L1 to L3 by causing determiner 34 to determine operators OP to be assigned to the component-mounting-related devices of component mounting lines L1 to L3 in a case where judging unit 33 judges that production capacity Cm estimated by production-capacity estimator 32 is equal to or greater than target production capacity 31g.

Figure 14:
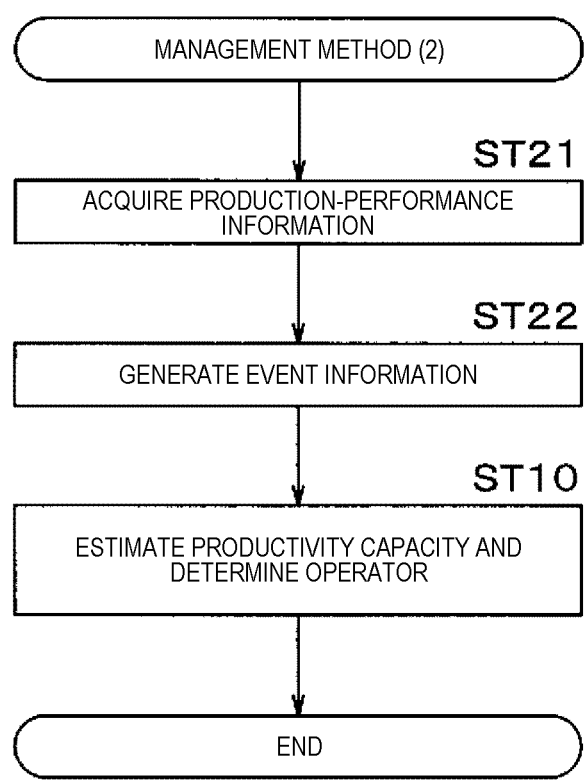
FIG. 14 is a flowchart of a second management method in the component mounting system according to the exemplary embodiment of the present disclosure.

Next, a second management method of optimizing the assignment of operators OP who do the work for producing assembly boards B in component mounting lines L1 to L3 will be described according to the flow of FIG. 14. The second management method is different from the first management method in that the information of the event such as the component shortage or the device error occurring in the component-mounting-related device is generated using production-performance information 31h indicating that assembly boards B are produced in component mounting lines L1 to L3 and production capacity Cm is estimated. Hereinafter the same stages as those in the above-described first management method will be assigned the same reference numerals, and the detailed description thereof will be omitted.

Initially, production-performance information acquirer 35 acquires production-performance information 31h of component mounting lines L1 to L3 from production history information stored in the component-mounting-related device (ST21: production-performance information acquisition stage). Acquired production-performance information 31h is stored in management memory 31. Production-performance information acquirer 35 may store production-performance information 31h immediately before production capacity Cm is estimated and for a period of time during which assembly boards B are produced in component mounting lines L1 to L3 while acquiring the production-performance information.

Subsequently, information generator 36 generates event information 31d relating to the event indicating that the work of operator OP is necessary for the component-mounting-related device based on production-performance information 31h stored in management memory 31 (ST22: information generator stage). That is, the information generator generates the information (event information 31d) relating to the event indicating that the work of operator OP is necessary for the component-mounting-related devices of component mounting lines L1 to L3 from acquired production-performance information 31h.

Subsequently, the operator determination stage (ST10) of determining operators OP by estimating production capacity Cm based on various information items stored in management memory 31 is performed similarly to the first management method. Accordingly, the assignment of operators OP is determined similarly to the first management method. In the second management method, since production capacity Cm is estimated by updating occurrence frequency Fe of the event such as the component shortage or the device error or the device stoppage time by using the production performance of assembly boards B, it is possible to improve estimation precision of production capacity Cm, and it is possible to optimize the assignment of operators OP such that an error from the production plan of assembly boards B becomes small.

As stated above, management computer 3 is a management apparatus that includes the memory (management memory 31) which stores floor-disposition information 31a, assembly-board information 31b, production-lot information 31c, operator information 31e, and production-plan information 31f, production-performance information acquirer 35 which acquires production-performance information 31h, information generator 36 which generates event information 31d, production-capacity estimator 32, judging unit 33, and determiner 34, and optimizes the assignment of operators OP who do the work for producing assembly boards B in component mounting lines L1 to L3 by causing determiner 34 to determine operators OP to be assigned to the component-mounting-related devices of component mounting lines L1 to L3 in a case where judging unit 33 judges that production capacity Cm estimated by production-capacity estimator 32 is equal to or greater than target production capacity 31g.

Next, a component mounting method in component mounting system 1 that includes component mounting lines L1 to L3 and the management apparatus (management computer 3) which optimizes the assignment of operators OP who do the work for producing assembly boards B in component mounting lines L1 to L3 will be described according to the flow of FIG. 15. Hereinafter, the same stages as those in the above-described second management method will be assigned the same reference numerals, and the detailed description thereof will be omitted.

Initially, similarly to the second management method, the production-performance information acquisition stage (ST21) of acquiring production-performance information 31h of component mounting lines L1 to L3 from history information stored in the component-mounting-related device is performed, and acquired production-performance information 31h is stored in management memory 31. Subsequently, similarly to the second management method, the information generation stage (ST22) of generating event information 31d based on production-performance information 31h store din management memory 31 is performed. That is, in the information generation stage (ST22), information generator 36 generates the information (event information 31d) relating to the event indicating that the work of operator OP is necessary for the component-mounting-related devices of component mounting lines L1 to L3 from production-performance information 31h stored in management memory 31 (production-performance information memory).

Figure 15:
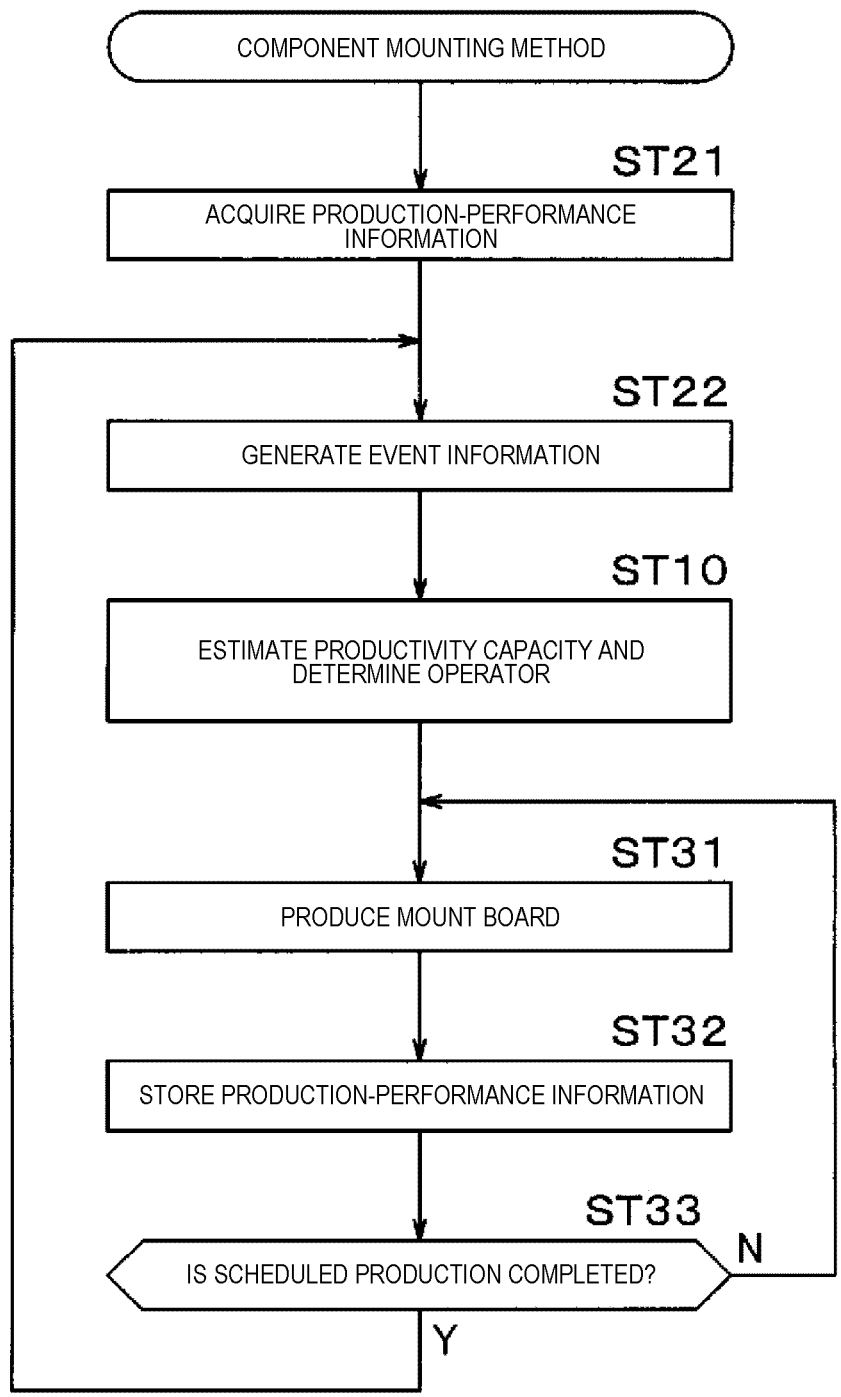
FIG. 15 is a flowchart of a component mounting method in the component mounting system according to the exemplary embodiment of the present disclosure.

In FIG. 15, subsequently, the operator determination stage (ST10) of determining operators OP by estimating production capacity Cm based on various information items stored in management memory 31 is performed similarly to the first management method and the second management method. Accordingly, the assignment of operators OP is determined similarly to the first management method and the second management method. Subsequently, assembly boards B are produced in component mounting lines L1 to L3 according to the assignment of operators OP (ST31: production stage).

If the component-mounting-related work for loaded boards 6A and 6B is completed in each component-mounting-related device, production-performance information acquirer 35 acquires production-performance information 31h, and stores the acquired production-performance information in management memory 31 (ST32: production-performance information storing stage). That is, in the production-performance information storing stage (ST32), production-performance information 31h of component mounting lines L1 to L3 is stored. That is, management memory 31 is a production-performance information memory that stores production-performance information 31h of component mounting lines L1 to L3. The production-performance information memory may be provided in a device different from management computer 3 connected to communication network 2.

Subsequently, it is judged whether or not the scheduled production of assembly boards B of the lot is completed and a set-up changing timing arrives (ST33). A production stage (ST31) and the production-performance information storing stage (ST32) are repeated for a period of time during which the scheduled production is not completed (No in ST33), and production-performance information 31h is updated for a period of time during which assembly boards B are produced. That is, in the production-performance information storing stage (ST32), production-performance information 31h stored in management memory 31 (production-performance information memory) is updated with production-performance information 31h acquired by producing assembly boards B according to the assignment of operators OP determined by determiner 34.

If the scheduled production of assembly boards B is completed (Yes in ST33), event information 31d is generated based on the production-performance by performing the information generation stage (ST22), production capacity Cm is estimated based on the production performance by performing the operator determination stage (ST10), and the assignment of operators OP for next production is determined.

As mentioned above, component mounting system 1 includes component mounting lines L1 to L3 that include a plurality of component-mounting-related devices including component mounters M6 to M9 is coupled and the management apparatus (management computer 3) that optimizes the assignment of operators OP who do the work for producing assembly boards B in component mounting lines L1 to L3. The management apparatus (management computer 3) includes management memory 31 that stores floor-disposition information 31a, assembly-board information 31b, production-lot information 31c, operator information 31e, and production-plan information 31f, information generator 36 that generates event information 31d, production-capacity estimator 32, judging unit 33, and determiner 34.

Component mounting system 1 includes the production-performance information memory (management memory 31) that stores production-performance information 31h, and updates production-performance information 31h stored in the production-performance information memory (management memory 31) with production-performance information 31h acquired by producing the assembly boards according to the assignment of operators OP determined by determiner 34 by causing determiner 34 to determine operators OP to be assigned to the component-mounting-related devices of component mounting lines L1 to L3 in a case where judging unit 33 judges that production capacity Cm estimated by production-capacity estimator 32 is equal to or greater than target production capacity 31g.

Accordingly, it is possible to optimize the assignment of operators OP who do the work for producing assembly boards B in component mounting lines L1 to L3 based on latest event information 31d.

As described above, a production-capacity estimation apparatus (management computer 3) estimates a production capacity of a component mounting line L1 for producing assembly boards B. The component mounting line L1 includes component-mounting-relevant devices M1 to M13 coupled to one another placed on a floor 4. The component-mounting-relevant devices M1 to M13 include a component mounter M6. The apparatus includes a memory 31, an input unit 37, and a production-capacity estimator 32. The memory 31 stores floor-disposition information 31a, production-lot information 31c, and event information 31d. The floor-disposition information 31a relates to a disposition of the component mounting line L1 on the floor 4. The production-lot information 31c relates to a time necessary for the component-mounting-relevant devices M1 to M13 to produce the assembly boards B. The event information 31d relates to an event indicating that a work of an operator OP is necessary for the component-mounting-relevant devices M1 to M13 and an occurrence frequency Fe indicating the number of occurrences of the event. The input unit 37 receives operator information 31e and production-plan information 31f. The operator information 31e relates to the operator OP. The production-plan information 31f relates to a production plan for producing the assembly boards B scheduled in the component mounting line L1. The production-capacity estimator 32 estimates, based on the floor-disposition information 31a, the production-lot information 31c, the event information 31d, the operator information 31e, and the production-plan information 31f, a production capacity of the component mounting line L1 for producing the assembly boards B according to the production plan.

The operator information 31e may include at least one of work ability of the operator OP, a work schedule of the operator OP, an assignment range of the operator OP on the floor 4, and a movement speed of the operator OP.

The component mounter M6 is configured to mount a component D on a board 6A. The event may include at least one of a shortage of the component D and a device error in which at least one of the component-mounting-relevant devices M1 to M13 is stopped.

The event information 31d may further relate to an event indicating that the work of the operator OP is not necessary but a process of resuming a stopped production of the assembly boards B is necessary in the component-mounting-relevant devices M1 to M13 and frequency Fe indicating that the number of occurrences of the event.

The production capacity may be one of the number of assembly boards B produced for a running time per day determined by the production plan, the number of assembly boards B produced for a predetermined running time, and a time necessary to produce the assembly boards B the number of which is determined by the production plan.

The productivity capacity estimation apparatus and the productivity capacity estimation method of the present disclosure have an advantage of estimating the productivity capacity of the mount boards in the component mounting line with high precision and are useful in the component mounting field in which the components are mounted on the boards.

What is claimed is:

1. A component mounting system having a control system for estimating a production capacity of a component mounting line for producing assembly boards, the component mounting system comprising:
    a component mounting line having a plurality of component-mounting-relevant devices coupled to one another and positioned on a floor, wherein a first plurality of assembly boards is produced in the component mounting line;
    a management computer coupled to the plurality of component-mounting-relevant devices via a communication network, the management computer receiving device error information from the plurality of component-mounting-relevant devices via the communication network, the management computer comprising:
        a memory that stores floor-disposition information, production-lot information, and event information, the floor-disposition information relating to an arrangement of the plurality of component-mounting-relevant devices on the floor, the production-lot information relating to a time necessary for the plurality of component-mounting-relevant devices to produce the assembly boards, the event information comprising the device error information received from the plurality of component-mounting-relevant devices and whether the device error required an operator to perform a recovery work or whether an automatic recovery process was performed and a frequency of each type of device error; and
        an input device that receives operator information and production-plan information, the operator information relating to the operator, the production-plan information relating to a production plan for producing the assembly boards scheduled in the component mounting line; and
    wherein prior to producing a second plurality of assembly boards in the component mounting line, the management computer estimates a production capacity of the component mounting line based on the floor-disposition information, the production-lot information, a prediction of an occurrence of device errors based on the event information, and the production-plan information,
    wherein after the production capacity of the component mounting line is estimated, the estimated production capacity is used to assign a plurality of operators to the component mounting line, based at least in part on the prediction of the occurrence of device errors and a number of operators required to perform the recovery work in order to reduce a stop time of the component-mounting-relevant devices, each of the plurality of operators is assigned to at least one of the component-mounted-relevant devices to execute a main work or a support work for the component-mounted-relevant devices to produce the second plurality of assembly boards in the first component mounting line, wherein after the second plurality of assembly boards are produced in the first component mounting line, the event information stored in the memory is updated with any device errors that occurred during production of the second plurality of assembly boards, and wherein the steps of estimating the production capacity, assigning the plurality of operators, producing the assembly boards, and updating the event information after producing the assembly boards are repeated.

2. The system of claim 1, wherein the operator information includes at least one of work ability of the operator, a work schedule of the operator, an assignment range of the operator on the floor, and a movement speed of the operator.

3. The system of claim 1, wherein the event information includes at least one of a shortage of a component.

4. The system of claim 1, wherein the production capacity is one of the number of assembly boards produced for a running time per day determined by the production plan, the number of assembly boards produced for a predetermined running time, and a time necessary to produce the assembly boards the number of which is determined by the production plan.

5. A method for estimating a production capacity of a component mounting line for producing assembly boards, the component mounting line including a plurality of component-mounting-relevant devices coupled to one another, the plurality of component-mounting-relevant devices including a component mounter, the method comprising:

producing a first plurality of assembly boards according to a production plan;

upon detecting a device error in which a component-mounting-relevant is stopped, determining if the device error requires an operator to perform a recovery work or whether an automatic recovery process can be performed;

storing each device error as event information, the event information including the type of device error, whether the operator was required, and a frequency of each type of device error;

prior to producing a second plurality of assembly boards, estimating a production capacity of the component mounting line for producing the second plurality of assembly boards based on floor-disposition information, production-lot information, the stored event information, operator information, and production-plan information, the floor-disposition information relating to an arrangement of the plurality of component-mounting-relevant devices on a floor and the production-lot information relating to a time necessary for the plurality of component-mounting-relevant devices to produce the assembly boards; and after estimating the production capacity of the component mounting line, using the estimated production capacity of the component mounting line to assign a number of operators to the component mounting line to execute a main work or a support work for the component-mounting-relevant devices to produce the second plurality of assembly boards in order to minimize a stop time of the component-mounting-relevant devices during production of the second plurality of assembly boards, after the second plurality of assembly boards are produced in the first component mounting line, updating the event information by using a production performance of the assembly boards, and repeating the steps of estimating the production capacity, assigning the number of operators, producing the plurality of assembly boards, and updating the event information after producing the assembly boards.

6. The method of claim 5, wherein the operator information includes at least one of work ability of the operator, a work schedule of the operator, an assignment range of the operator on the floor, and a movement speed of the operator.

7. The method of claim 5, wherein the event information includes at least one of a shortage of a component.

8. The method of claim 5, wherein the production capacity is one of the number of assembly boards produced for a running time per day determined by the production plan, the number of assembly boards produced for a predetermined running time, and a time necessary to produce the assembly boards the number of which is determined by the production plan.

* * * * *